(12) United States Patent
Liu et al.

(10) Patent No.: US 9,469,184 B2
(45) Date of Patent: Oct. 18, 2016

(54) SINGLE-INPUT AND SINGLE-OUTPUT HYBRID SYSTEM

(71) Applicants: Bradford P Liu, Bloomfield Hills, MI (US); Feisel Weslati, Troy, MI (US)

(72) Inventors: Bradford P Liu, Bloomfield Hills, MI (US); Feisel Weslati, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/809,604

(22) Filed: Jul. 27, 2015

(65) Prior Publication Data

US 2015/0328975 A1    Nov. 19, 2015

Related U.S. Application Data

(62) Division of application No. 13/588,332, filed on Aug. 17, 2012, now Pat. No. 9,188,201.

(51) Int. Cl.
| | |
|---|---|
| B60K 6/445 | (2007.10) |
| B60K 6/26 | (2007.10) |
| F16H 3/66 | (2006.01) |
| F16H 3/72 | (2006.01) |
| F16H 37/08 | (2006.01) |
| B60K 6/365 | (2007.10) |
| F16H 37/10 | (2006.01) |

(52) U.S. Cl.
CPC .............. *B60K 6/445* (2013.01); *B60K 6/26* (2013.01); *B60K 6/365* (2013.01); *F16H 3/666* (2013.01); *F16H 3/72* (2013.01); *F16H 3/727* (2013.01); *B60K 2006/266* (2013.01); *F16H 2037/0866* (2013.01); *F16H 2037/103* (2013.01); *F16H 2200/2005* (2013.01); *F16H 2200/2025* (2013.01); *Y10S 903/906* (2013.01); *Y10S 903/911* (2013.01)

(58) Field of Classification Search
None
See application file for complete search history.

(56) References Cited

U.S. PATENT DOCUMENTS

| | | | |
|---|---|---|---|
| 6,428,438 B1 | 8/2002 | Bowen | |
| 6,692,401 B2* | 2/2004 | Hofschulte | F16H 1/227 475/331 |
| 6,715,291 B1* | 4/2004 | Liao | B60K 6/26 180/65.235 |
| 7,223,199 B2* | 5/2007 | Willmot | B60K 6/36 475/269 |
| 2006/0046886 A1 | 3/2006 | Holmes et al. | |
| 2006/0247089 A1* | 11/2006 | Guo | F16H 1/28 475/338 |
| 2011/0045931 A1* | 2/2011 | Raghavan | B60K 6/365 475/221 |

* cited by examiner

*Primary Examiner* — Colby M Hansen
(74) *Attorney, Agent, or Firm* — Ralph E. Smith

(57) ABSTRACT

A hybrid assembly having a single input and a single output. The hybrid assembly is compactly packaged and achieves a wide range of gear ratios. The hybrid assembly may be used in a vehicle power train with or without an additional transmission.

11 Claims, 5 Drawing Sheets

SINGLE-INPUT AND SINGLE-OUTPUT HYBRID SYSTEM

FIELD

The present disclosure relates to a hybrid propulsion system, more particularly, to a compact hybrid propulsion system having a single input and a single output.

BACKGROUND

Many modern automobiles utilize a hybrid transmission system in which an internal combustion engine, electric machine, or combination of the two provides propulsion for the vehicle. In a typical hybrid transmission system, torque from the engine and electric machines is supplied to a plurality of gears and shifting elements. Torque is output from this plurality of gears and clutches to drive the wheels of the vehicle. A typical hybrid transmission features either an electrically variable transmission mode ("EVT mode") or a fixed gear mode, but not both. In an EVT mode, torque must be supplied by both the engine and the electric machines and the overall transmission gear ratio between the transmission input and output can be constantly varied between a theoretically limitless number of gear ratios. In a fixed gear mode, power may be supplied by either or both of the engine and electric machines, but the overall transmission gear ratio between the transmission input and output can only be a limited number of fixed gear ratios. While some hybrid transmissions do feature both an EVT mode and fixed gear mode, these transmissions typically have augmented structures and generally require complicated torque and speed controls.

Typical hybrid transmissions are large and bulky. This makes it more difficult to integrate them into a vehicle's powertrain. Decreasing the size of a typical hybrid transmission often results in decreased torque capability and performance. Further, typical hybrid transmissions serve as the only ratio-adjusting link between the engine and the wheels of the vehicle. This is largely a result of the intricate connections among the engine, electric machine, and hybrid transmission. These complicated connections make the addition of a typical hybrid transmission a complex process. Moreover, these complicated connections typically are not configured as single input and single output and prevent the use of an additional gearbox such as a conventional automatic transmission because of packaging and complexity concerns. This limits the overall gear ratio achievable by the hybrid drive system.

What is needed, therefore, is a compact and robust hybrid drive system that offers both an EVT mode and a fixed gear mode and that retains full functionality of the engine and electric machines regardless of their operating state. What is also needed is a hybrid drive system that achieves an increased range of power modes to expand hybrid power manipulation space and to enhance vehicle drivability. What is further needed is a simple hybrid transmission that can be added to existing automobiles with or without an additional transmission. What is further needed is a hybrid transmission having controls independent from those of an optional automatic transmission.

SUMMARY

In one form, the present disclosure provides a hybrid drive train including a hybrid assembly. The hybrid assembly includes a compound planetary gear set, a first electric machine having a first electric machine rotor coupled to a sun gear of the compound planetary gear set, and a second electric machine having a second electric machine rotor coupled to the compound planetary gear set. The hybrid assembly also includes a first clutch configured to selectively lock the planetary gear set.

In another form, the present disclosure provides a hybrid drive train including a hybrid assembly. The hybrid assembly includes a compound planetary gear set including a ring gear, a carrier, a first plurality of planetary gears rotatably mounted on the carrier and continuously meshed with the ring gear, a second plurality of planetary gears rotatably mounted on the carrier, and a sun gear continuously meshed with the second plurality of planet gears. The hybrid assembly further includes a first electric machine having a first electric machine rotor coupled to the sun gear, and a second electric machine having a second electric machine rotor coupled to the compound planetary gear set. The hybrid assembly also includes a first clutch configured to selectively lock the planetary gear set, and a brake clutch configured to selectively couple the first electric machine rotor to a housing of the hybrid assembly.

Thus, a compact and robust hybrid drive system is provided that offers both an EVT mode and a fixed gear mode and retains full functionality of the engine and electric machines regardless of their operating state. The hybrid drive system achieves an increased range of gear ratios. The hybrid drive system can be added to existing automobiles with or without an additional transmission. The hybrid transmission has controls independent from those of the optional additional transmission.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Before describing the disclosed embodiments of the technology in detail, it is to be understood that the technology is not limited in its application to the details of the particular arrangement shown herein since the technology is capable of other embodiments. Also, the terminology used herein is for the purpose of description and not of limitation.

Figure 1:
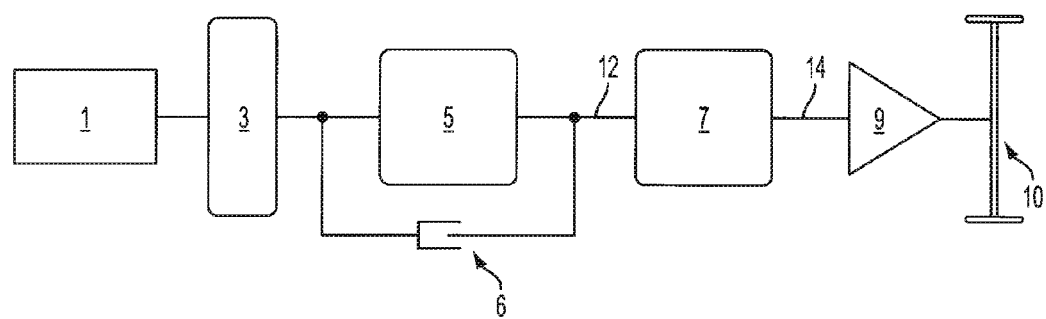
FIG. 1 is a schematic representation of an exemplary prior art drive train having an automatic transmission.

FIG. 1 illustrates an example schematic representation of a prior art drive train having an automatic transmission. The prior art drive train includes an engine 1 coupled to a torsional vibration damper 3. The engine 1 may be any type of power source including an internal combustion engine, turbine engine, or any other desired power source. The torsional vibration damper 3 is coupled to a torque converter 5. The torque converter 5 is coupled by a shaft 12 to an automatic transmission 7. The automatic transmission 7 is coupled by a shaft 14 to a final drive 9 that is coupled to a drive axle 10. In one embodiment, the drive train includes a torque converter lockup clutch 6 that selectively couples the torsional vibration damper 3 to the shaft 12. The torsional vibration damper 3, torque converter 5, automatic transmission 7, final drive 9, drive axle 10, and torque converter lockup clutch 6 are all typical components in a vehicle drive train as would be understood by one of skill in the art.

Figure 2:
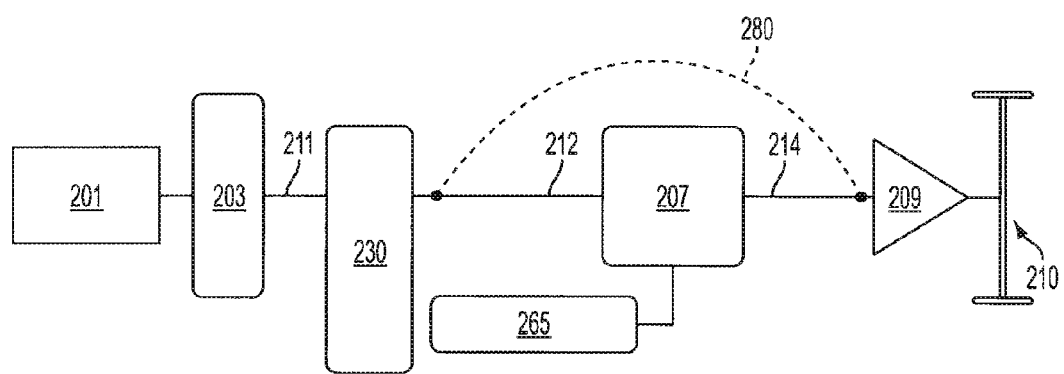
FIG. 2 is a schematic representation of the drive train of FIG. 1 having an exemplary compact single-input and single-output hybrid system.

FIG. 2 is an example schematic representation of the drive train of FIG. 1 having a single-input and single-output hybrid system according to an embodiment disclosed herein. The drive train includes an engine 201 coupled to a torsional vibration damper 203. The engine 201 may be any type of power source including an internal combustion engine, turbine engine, electric machine, or any other desired power source. The torsional vibration damper 203 is coupled to a single-input and single-output hybrid assembly 230 ("hybrid assembly") by a shaft 211. The hybrid assembly 230 is coupled by a shaft 212 to an automatic transmission 207. The automatic transmission 207 is coupled by a shaft 214 to a final drive 209 that is coupled to a drive axle 210. In one embodiment, the hybrid assembly 230 may be directly coupled to the final drive 209, and the automatic transmission 207 may be omitted. In one embodiment, the drive train includes a bypass linkage 280 that selectively connects the hybrid assembly 230 to the final drive 209, bypassing the automatic transmission 207. In one embodiment, the bypass linkage 280 selectively connects the hybrid assembly 230 to the drive axle 210, bypassing the automatic transmission 207 and the final drive 209.

The drive train also includes an automatic transmission auxiliary pump 265. The automatic transmission auxiliary pump 265 includes at least one electric motor that drives a hydraulic or electric pump to provide the force necessary to operate the clutches of the automatic transmission 207 when the engine 201 is not operating.

Figure 3:
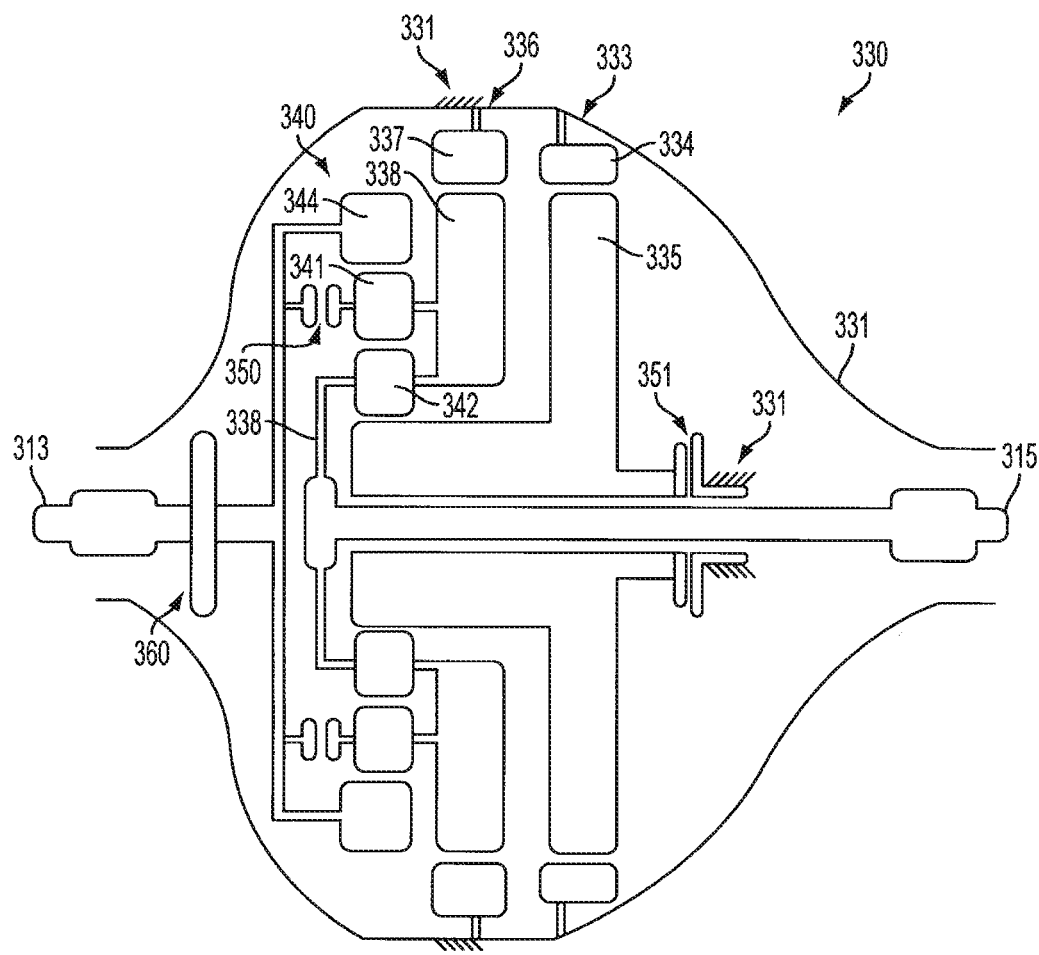
FIG. 3 is a schematic representation of the compact single-input and single-output hybrid system of FIG. 2.

FIG. 3 is an example schematic representation of the single-input and single-output hybrid system ("hybrid assembly") of FIG. 2 according to an embodiment disclosed herein. The hybrid assembly 330 includes a housing 331 that surrounds the components of the hybrid assembly 330. The hybrid assembly 330 also includes a hydraulic or electric pump 360 coupled to a hybrid assembly input shaft 313. The hybrid assembly input shaft 313 is also coupled to shaft 211 of FIG. 2. The hydraulic or electric pump 360 supplies oil pressure to operate a first clutch 350 and a brake clutch 351 of the hybrid assembly 330. In one embodiment, the hydraulic or electric pump 360 may be omitted. The hybrid assembly 330 also includes a first electric machine 333 having a first electric machine rotor 335 and a first electric machine stator 334. The first electric machine stator 334 is non-rotatably coupled to the transmission housing 331. The hybrid assembly 330 further includes a second electric machine 336 having a second electric machine rotor 338 and a second electric machine stator 337. The second electric machine stator 337 is non-rotatably coupled to the transmission housing 331.

The shaft 313 is also coupled to a ring gear 344 of a compound planetary gear set 340. A first plurality of planet gears 341 are rotatably mounted on the second electric machine rotor 338. The first plurality of planet gears 341 are continuously meshed with the ring gear 344. A second plurality of planet gears 342 are also rotatably mounted on the second electric machine rotor 338. The second plurality of planet gears 342 are continuously meshed with the first electric machine rotor 335. The second plurality of planet gears 342 are meshed with the first plurality of planet gears 341. The second plurality of planet gears 342 and first plurality of planet gears 341 are both rotatably mounted on the second electric machine rotor 338. In the embodiment of FIG. 3, the first electric machine rotor 335 acts as the sun gear of the compound planetary gear set 340 and the second electric machine rotor 338 acts as the carrier of the compound planetary gear set 340. The second electric machine rotor 338 is coupled to a hybrid assembly output shaft 315. The hybrid assembly output shaft 315 is coupled to shaft 212 of FIG. 2.

The first clutch 350 selectively couples the ring gear 344 to the second electric machine rotor 338, thereby, locking the compound planetary gear set 340. The brake clutch 351 selectively couples the first electric machine rotor 335 to the hybrid housing 331, thereby, selectively preventing the first electric machine rotor 335 from rotating. The first clutch 350 and brake clutch 351 may be any type of clutch including, but not limited to, a dry clutch, wet clutch, or dog clutch. In one embodiment, the first electric machine rotor 335 and second electric machine rotor 338 may have the same diameter. In another embodiment, the first electric machine rotor 335 may have a smaller diameter than the second electric machine rotor 338. In another embodiment, the first electric machine rotor 335 may have a larger diameter than the second electric machine rotor 338. In one embodiment, one of the brake clutch 351 or first clutch 350 may be omitted entirely.

Figure 4:
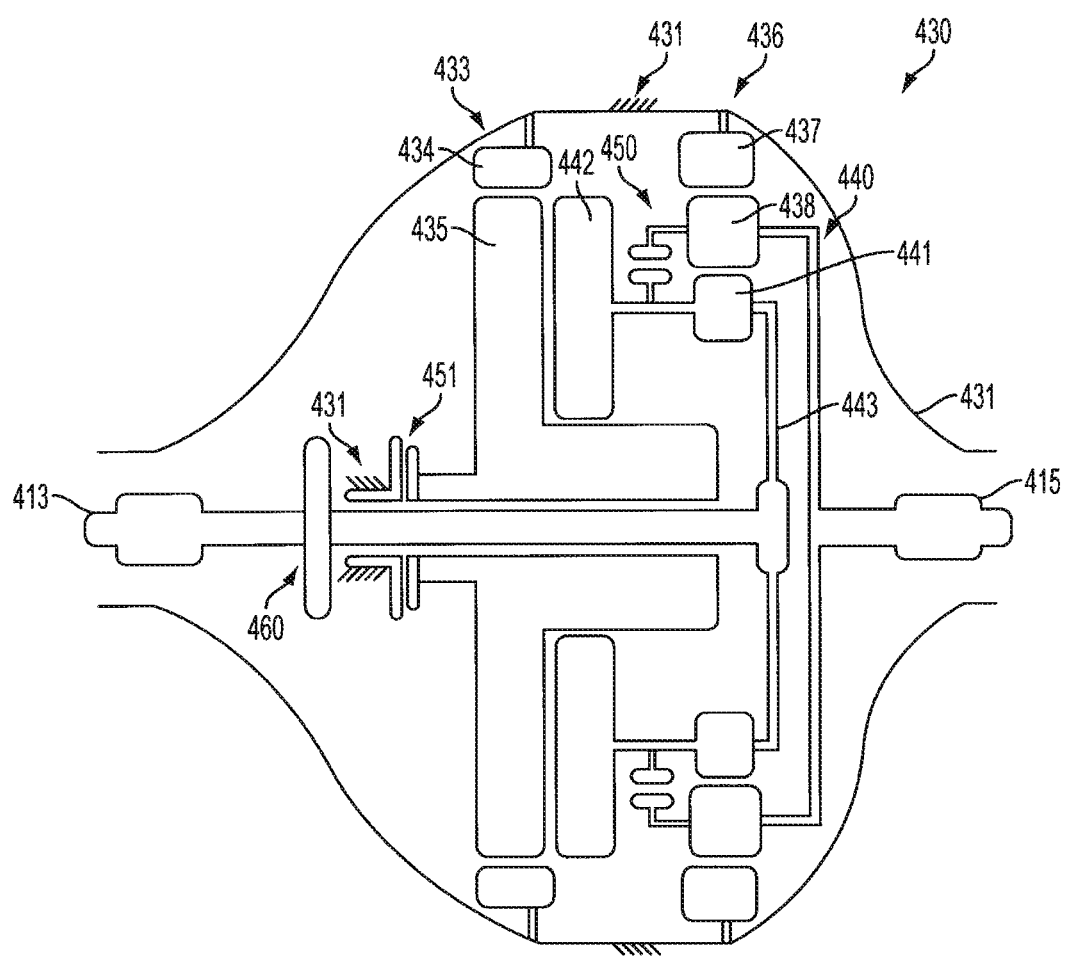
FIG. 4 is a schematic representation of the compact single-input and single-output hybrid system of FIG. 2 according to another embodiment.

FIG. 4 is a schematic representation of the compact single-input and single-output hybrid system ("hybrid assembly") of FIG. 2 according to another embodiment disclosed herein. The hybrid assembly 430 includes a housing 431 that surrounds the components of the hybrid assembly 430. The hybrid assembly 430 also includes a hydraulic or electric pump 460 coupled to a hybrid assembly input shaft 413. The hybrid assembly input shaft 413 is also coupled to shaft 211 of FIG. 2. The hydraulic or electric pump 460 supplies oil pressure to operate a first clutch 450 and a brake clutch 451 of the hybrid assembly 430. In one embodiment, the hydraulic or electric pump 460 may be omitted. The hybrid assembly 430 also includes a first electric machine 433 having a first electric machine rotor 435 and a first electric machine stator 434. The first electric machine stator 434 is non-rotatably coupled to the transmission housing 431. The hybrid assembly 430 further includes a second electric machine 436 having a second electric machine rotor 438 and a second electric machine stator 437. The second electric machine stator 437 is non-rotatably coupled to the transmission housing 431.

The shaft 413 is also coupled to a carrier 443 of a compound planetary gear set 440. A first plurality of planet gears 441 and second plurality of planet gears 442 are rotatably mounted on the carrier 443. The first plurality of planet gears 441 and second plurality of planet gears 442 are coupled together and rotate synchronously. In one embodiment, the diameter of the first plurality of planet gears 441 may be smaller than the diameter of the second plurality of planet gears 442. The first plurality of planet gears 441 are continuously meshed with the second electric machine rotor 438. The second plurality of planetary gears 442 are continuously meshed with the first electric machine rotor 435.

In the embodiment of FIG. 4, the first electric machine rotor 435 acts as the sun gear of the compound planetary gear set 440, and the second electric machine rotor 438 acts as the ring gear of the compound planetary gear set 440. The second electric machine rotor 438 is coupled to a hybrid assembly output shaft 415. The hybrid assembly output shaft 415 is coupled to shaft 212 of FIG. 2.

The first clutch 450 selectively couples the carrier 443 to the second electric machine rotor 438, thereby, locking the compound planetary gear set 440. The brake clutch 451 selectively couples the first electric machine rotor 435 to the hybrid housing 431, thereby, selectively preventing the first electric machine rotor 435 from rotating. The first clutch 450 and brake clutch 451 may be any type of clutch including, but not limited to, a dry clutch, wet clutch, or dog clutch. In one embodiment, the first electric machine rotor 435 and second electric machine rotor 438 may have the same diameter. In another embodiment, the first electric machine rotor 435 may have a smaller diameter than the second electric machine rotor 438. In another embodiment, the first electric machine rotor 435 may have a larger diameter than the second electric machine rotor 438. In one embodiment, one of the brake clutch 451 or first clutch 450 may be omitted entirely.

Figure 5:
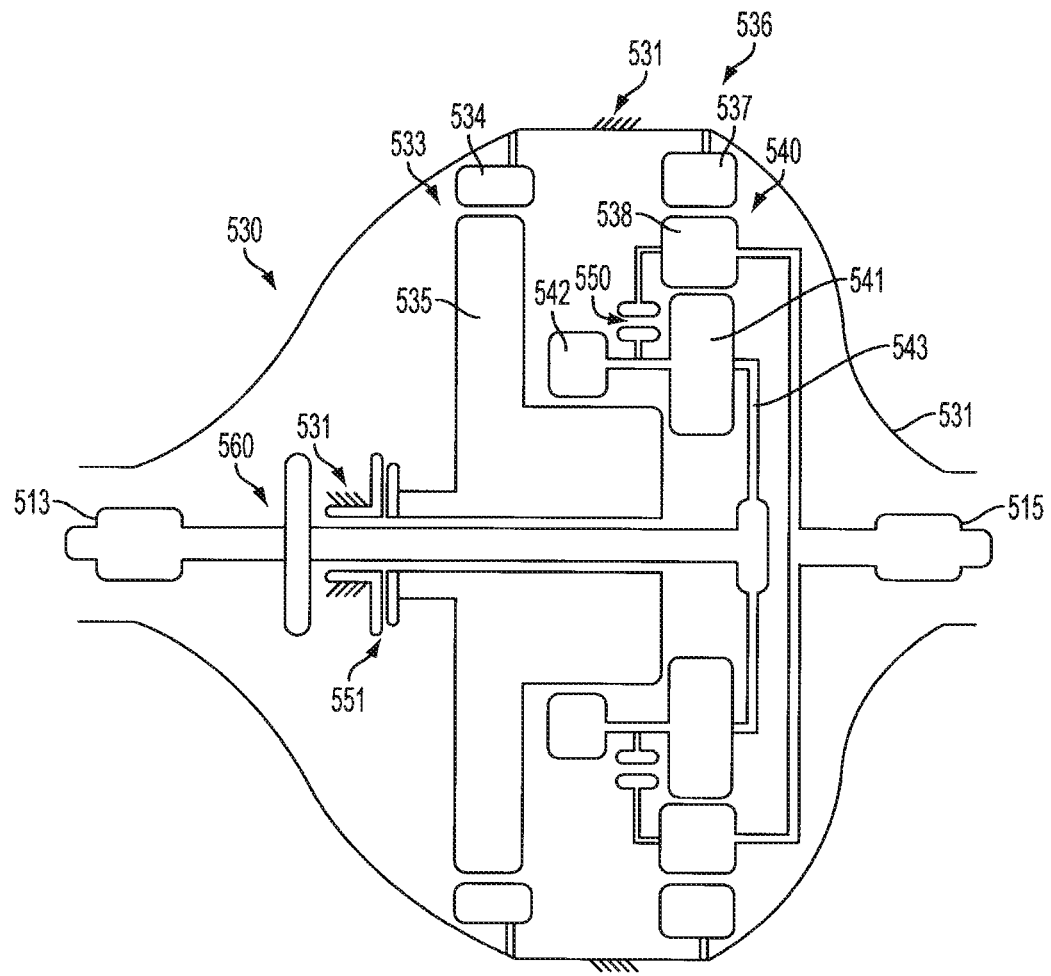
FIG. 5 is a schematic representation of the compact single-input and single-output hybrid system of FIG. 2 according to yet another embodiment.

FIG. 5 is a schematic representation of the compact single-input and single-output hybrid system ("hybrid assembly") of FIG. 2 according to yet another embodiment disclosed herein. The hybrid assembly 530 includes a housing 531 that surrounds the components of the hybrid assembly 530. The hybrid assembly 530 also includes a hydraulic or electric pump 560 coupled to a hybrid assembly input shaft 513. The hybrid assembly input shaft 513 is also coupled to shaft 211 of FIG. 2. The hydraulic or electric pump 560 supplies oil pressure to operate a first clutch 550 and a brake clutch 551 of the hybrid assembly 530. In one embodiment, the hydraulic or electric pump 560 may be omitted. The hybrid assembly 530 also includes a first electric machine 533 having a first electric machine rotor 535 and a first electric machine stator 534. The first electric machine stator 534 is non-rotatably coupled to the transmission housing 531. The hybrid assembly 530 further includes a second electric machine 536 having a second electric machine rotor 538 and a second electric machine stator 537. The second electric machine stator 537 is non-rotatably coupled to the transmission housing 531.

The shaft 513 is also coupled to a carrier 543 of a compound planetary gear set 540. A first plurality of planet gears 541 and second plurality of planet gears 542 are rotatably mounted on the carrier 543. The first plurality of planet gears 541 and second plurality of planet gears 542 are coupled together and rotate synchronously. In one embodiment, the diameter of the first plurality of planet gears 541 may be larger than the diameter of the second plurality of planet gears 542. The first plurality of planet gears 541 are continuously meshed with the second electric machine rotor 538. The second plurality of planetary gears 542 are continuously meshed with the first electric machine rotor 535. In the embodiment of FIG. 5, the first electric machine rotor 535 acts as the sun gear of the compound planetary gear set 540, and the second electric machine rotor 535 acts as the ring gear of the compound planetary gear set 540. The second electric machine rotor 538 is coupled to a hybrid assembly output shaft 515. The hybrid assembly output shaft 515 is coupled to shaft 212 of FIG. 2.

The first clutch 550 selectively couples the carrier 543 to the second electric machine rotor 538, thereby, locking the compound planetary gear set 540. The brake clutch 551 selectively couples the first electric machine rotor 535 to the hybrid housing 531, thereby, selectively preventing the first electric machine rotor 535 from rotating. The first clutch 550 and brake clutch 551 may be any type of clutch including, but not limited to, a dry clutch, wet clutch, or dog clutch. In one embodiment, the first electric machine rotor 535 and second electric machine rotor 538 may have the same diameter. In another embodiment, the first electric machine rotor 535 may have a smaller diameter than the second electric machine rotor 538. In another embodiment, the first electric machine rotor 535 may have a larger diameter than the second electric machine rotor 538. In one embodiment, one of the brake clutch 551 or first clutch 550 may be omitted entirely.

The hybrid assemblies of FIGS. 3-5 may be operated in four different modes. However, if one of the brake clutch 351, 451, 551 or the first clutch 350, 450, 550 are omitted, the hybrid assemblies may only be operated in two modes. For the sake of simplicity, the operating modes will be described with respect to the embodiment of FIG. 3. The operating modes of the embodiments of FIGS. 4 and 5 are identical except where noted otherwise.

In a first mode, the hybrid assembly 330, may be operated as an electrically variable transmission ("EVT mode") such that the ratio between the RPM of the hybrid assembly input shaft 313 and hybrid assembly output shaft 315 is continuously variable by adjusting the torque supplied by the first electric machine 333, second electric machine 336, and engine 201. To operate in the EVT mode, the first clutch 350 and the brake clutch 351 are deactivated. Thus, the first electric machine rotor 335 is free to rotate independently of the housing 331. In the embodiment of FIG. 3, the second electric machine rotor 338 is free to rotate at a corresponding but different RPM than the ring gear 344. In the embodiment of FIG. 4, the carrier 443 is free to rotate at a corresponding but different RPM than the second electric machine rotor 438. In the embodiment of FIG. 5, the carrier 543 is free to rotate at a corresponding but different RPM than the second electric machine rotor 538. As a result, there are two degrees of freedom within the hybrid assembly 330. Torque to the hybrid assembly output shaft 315 may be provided by the engine 201 in combination with the first electric machine 333 while the second electric machine 336 generates electricity. Alternatively, when additional torque is demanded, the engine 201, first electric machine 333, and second electric machine 336 may all provide torque. Further, both first electric machine 333 and second electric machine 336 may be used to generate electricity during vehicle regenerative braking or as otherwise desired.

In a second mode, the hybrid assembly 330 may operate in a fixed gear ratio ("fixed gear mode") in which the ratio between the RPM of the hybrid assembly input shaft 313 and hybrid assembly output shaft 315 is constant regardless of the amount of torque supplied by the second electric machine 336 and engine 201. To operate in the fixed gear mode, the first clutch 350 is deactivated and the brake clutch 351 is activated. In the embodiment of FIG. 3, the second electric machine rotor 338 is free to rotate at a corresponding but different RPM than the ring gear 344, but the first electric machine rotor 335 is locked to the housing 331 and does not rotate. In the embodiment of FIG. 4, the carrier 443 is free to rotate at a corresponding but different RPM than the second electric machine rotor 438, but the first electric machine rotor 435 is locked to the housing 431 and does not rotate. In the embodiment of FIG. 5, the carrier 543 is free to rotate at a corresponding but different RPM than the second electric machine rotor 538, but the first electric machine rotor 535 is locked to the housing 531 and does not rotate. Because the first electric machine rotor 335 is locked, rotation of the planet gears 341 will cause the second electric machine rotor 338 to rotate. As a result, there is only one degree of freedom within the hybrid assembly 330. Torque to the hybrid assembly output shaft 315 may be provided by the engine 201 and the second electric machine 336, 436, 536. The second electric machine 336 may be used to generate electricity or to provide additional torque as desired.

In a third mode, the hybrid assembly 330 may operate in a direct gear ratio ("direct gear mode") in which the hybrid assembly input shaft 313 and hybrid assembly output shaft 315 rotate at the same RPM regardless of the amount of torque supplied by the first electric machine 333, second electric machine 336, and engine 201. To operate in the direct gear mode, the first clutch 350 is activated and the brake clutch 351 is deactivated. In the embodiment of FIG. 3, the second electric machine rotor 338 rotates at the same RPM as the ring gear 344 and the first electric machine rotor 335, and the first electric machine rotor 335 is free to rotate independently of the housing 331. In the embodiment of FIG. 4, the carrier 443 rotates at the same RPM as the second electric machine rotor 438 and the first electric machine rotor 435, and the first electric machine rotor 435 is free to rotate independently of the housing 431. In the embodiment of FIG. 5, the carrier 543 rotates at the same RPM as the second electric machine rotor 538 and the first electric machine rotor 535, and the first electric machine rotor 535 is free to rotate independently of the housing 531. In effect, the planetary gear set 340 is converted to a direct gear with a unity gear ratio. As a result, there is only one degree of freedom within the hybrid assembly 330. Torque to the hybrid assembly output shaft 315 may be provided by the engine 201 in combination with the first electric machine 333 and the second electric machine 336

In a fourth mode, the hybrid assembly 330 may be locked ("locked mode") to prevent any rotation of the hybrid assembly input shaft 313 and hybrid assembly output shaft 315. To operate in the locked mode, the first clutch 350 and the brake clutch 351 are activated. In the embodiment of FIG. 3, the second electric machine rotor 338 rotates at the same RPM as the ring gear 344, and the first electric machine rotor 335 is locked to the housing 331. In the embodiment of FIG. 4, the carrier 443 rotates at the same RPM as the second electric machine rotor 438, and the first electric machine rotor 435 is locked to the housing 431. In the embodiment of FIG. 5, the carrier 543 rotates at the same RPM as the second electric machine rotor 538, and the first electric machine rotor 535 is locked to the housing 531. As a result, there are zero degrees of freedom within the hybrid assembly 330. In one embodiment, the locked mode may used as a mechanical parking brake.

In one embodiment, the automatic transmission 207 may be a manual transmission or any other type of desired transmission or power transfer device. In one embodiment, the automatic transmission 207 may be omitted altogether and any necessary ratio shifting may be provided by one of the hybrid assemblies 330, 430, 530. In one embodiment, the bypass linkage 280 may be used to selectively bypass the automatic transmission 207 and couple one of the hybrid assemblies 330, 430, 530 directly to the final drive 209. Thus, in one embodiment, the hybrid assembly 330, 430, 530 may be the sole ratio shifting device between the engine 201 and the wheels of a vehicle.

In one embodiment, the hybrid assembly 230 may function as a torque converter replacement in a conventional, non-hybrid automatic transmission. Because the hybrid assembly 230 may provide an infinite number of gear ratios between the engine 201 and drive axle 210, including varying the drive axle RPM to zero while the engine 201 continues to rotate, a torque converter 5 need not be included in a vehicle featuring a hybrid assembly 230. In addition, this infinitely variable number of gear ratios, particularly the drive axle RPM to zero, permits the hybrid assembly 230 to function as a vehicle launch device.

In one embodiment, the control of the hybrid assembly and its first clutch and brake clutch may be achieved by an electronic control unit. In one embodiment, the electric control unit may be the same as or different from the electronic control unit used to control the optional automatic transmission.

Thus, a compact and robust hybrid drive system offering both an EVT mode and a fixed gear mode is described. The hybrid drive system achieves an increased range of modes. The hybrid drive system retains full functionality of the engine and electric machines regardless of their operating state. The hybrid drive system can be added to existing automobiles with or without an additional transmission. The hybrid transmission may have controls independent from those of the automatic transmission.

What is claimed is:

1. A hybrid drive train, comprising:
    a hybrid assembly, including:
        a compound planetary gear set;
        a first electric machine having a first electric machine rotor integrally forming and acting as a sun gear of the compound planetary gear set;
        a second electric machine having a second electric machine rotor integrally forming and acting as a ring gear of the compound planetary gear set;
        a first clutch configured to selectively lock the planetary gear set; and
        a second clutch configured to selectively directly couple the rotor and sun gear to a housing of the hybrid assembly thereby preventing both the first electric machine and the sun gear of the compound planetary gear set from rotating.

2. The hybrid drive train of claim 1, wherein:
    a first plurality of planet gears of the compound planetary gear set is rotatably mounted on a carrier of the compound planetary gear set and continuously meshed with the ring gear;
    a second plurality of planet gears of the compound planetary gear set is rotatably mounted on the carrier and continuously meshed with the sun gear; and
    the first plurality of planet gears and the second plurality of planet gears are non-rotatably coupled.

3. The hybrid drive train of claim 2, wherein the first plurality of planet gears and the second plurality of planet gears are non-rotatably coupled along a common axis.

4. The hybrid drive train of claim 2, wherein the first clutch selectively directly couples the ring gear to the second plurality of planet gears, thereby locking the compound planetary gear set.

5. The hybrid drive train of claim 2, further comprising:
    a hybrid assembly input shaft coupled to the carrier;
    a hybrid assembly output shaft coupled to the ring gear;
    an engine coupled to the hybrid assembly input shaft; and
    an automatic transmission coupled to the hybrid assembly output shaft.

6. The hybrid drive train of claim 5, wherein the automatic transmission is coupled to a final drive; and further comprising a bypass linkage selectively coupling the hybrid assembly output shaft directly to the final drive thereby bypassing the automatic transmission.

7. The hybrid drive train of claim 2, further comprising:
a hybrid assembly input shaft coupled to the carrier;
a hybrid assembly output shaft coupled to the ring gear;
an engine coupled to the hybrid assembly input shaft; and
a final drive directly coupled to the hybrid assembly output shaft.

8. The hybrid drive train of claim 5, wherein the input shaft is directly coupled to the carrier and the output shaft is directly coupled to the ring gear.

9. The hybrid drive train of claim 8, wherein the input shaft and the output shaft share a common axis of rotation and are axially spaced apart.

10. The hybrid drive train of claim 9, wherein the input shaft, output shaft, first electric machine, second electric machine and compound planetary gear set share a common axis of rotation.

11. The hybrid drive train of claim 5, wherein the hybrid assembly is configured to:
operate in a first mode where a ratio between a speed of the input shaft and a speed of the output shaft is continually variable by deactivating the first and second clutches;
operate in a second mode where a ratio of the speed of the input shaft and the speed of the output shaft is constant by deactivating the first clutch and activating the second clutch;
operate in a third mode where the speed of the input shaft and the speed of the output shaft is equal by activating the first clutch and deactivating the second clutch; and
operate in a fourth mode where the input shaft and the output shaft are locked by activating the first clutch and the second clutch.

* * * * *